United States Patent [19]

Wautier et al.

[11] Patent Number: 4,968,498
[45] Date of Patent: Nov. 6, 1990

[54] PROCESS FOR THE MANUFACTURE OF A MIXED METAL OXIDE POWDER, AND MIXED METAL OXIDE POWDERS

[75] Inventors: Henri Wautier, Braine-le-Comte; Luc Lerot, Bruxelles, both of Belgium

[73] Assignee: Solvay & Cie (Societe Anonyme), Brussels, Belgium

[21] Appl. No.: 206,730

[22] Filed: Jun. 15, 1988

[30] Foreign Application Priority Data

Jun. 29, 1987 [FR] France .................... 87 09116

[51] Int. Cl.$^5$ ............................ C01D 13/36
[52] U.S. Cl. .................... 423/593; 423/158; 423/161; 423/184; 423/508
[58] Field of Search ............ 423/593, 158, 161, 184, 423/508

[56] References Cited

U.S. PATENT DOCUMENTS 4,636,378  1/1987  Pastor et al. .
4,830,993  5/1989  Legrand et al. .................. 501/103

FOREIGN PATENT DOCUMENTS 0079392  5/1982  European Pat. Off. .
125507   4/1984  European Pat. Off. .
0177198  9/1985  European Pat. Off. .
6086022  9/1985  European Pat. Off. .

OTHER PUBLICATIONS

Patent Abstracts of Japan, vol. 9, No. 222, (C-302), (1945), Sep. 9, 1985; & JP-A-60 86 022 (Mitsubishi Kogyo Cement K.K.), 15-05-1985, *en entier*.
Chemical Abstracts, vol. 104, No. 18, 5 mai 1986, pp. 347-348; resume No. 154468m, Columbus, Ohio, US; & JP-A-60 246 254, (Dainippon Ink and Chemicals, Inc.), 05-12-1985, *en entier*.
Patent Abstracts of Japan, vol. 8, No. 34, (C-210), (1471), 15 fevrier 1984, & JP-A-58 198491, (Nippon Soda K.K.), 18-11-1983.

Primary Examiner—William R. Dixon, Jr.
Assistant Examiner—David M. Brunsman
Attorney, Agent, or Firm—Stevens, Davis, Miller & Mosher

[57] ABSTRACT

Process for the manufacture of a mixed metal oxide powder, in which at least one metal alcoholate is hydrolyzed in the presence of at least one metal oxide or hydroxide and of an acidic organic compound containing more than 6 carbon atoms in the molecule. The process is applicable to the production of barium titanate powders.

14 Claims, 5 Drawing Sheets

PROCESS FOR THE MANUFACTURE OF A MIXED METAL OXIDE POWDER, AND MIXED METAL OXIDE POWDERS

FIELD OF THE INVENTION

The invention relates to a process for the manufacture of mixed metal oxide powders.

BACKGROUND OF THE INVENTION

It is known that mixed metal oxide powders can be manufactured by hydrolysis of a metal alcoholate in the presence of a metal oxide or hydroxide, under certain conditions. For this purpose, U.S. Pat. No. A-4,636,378 (Hughes Aircraft Company) describes a process for the manufacture of a barium titanate powder exhibiting the tetragonal crystalline structure of perovskite, according to which a titanium alcoholate is introduced gradually into an aqueous solution of barium hydroxide, to form a gel of titanium oxide hydrate, the reaction mixture is then heated to above 100° C in an autoclave kept under pressure and then, after it has been cooled to ambient temperature, it is subjected successively to a moderate heating at atmospheric pressure and to a dialysis.

The disadvantage of this known process is that it is highly complex and that it requires a costly apparatus. Furthermore, the powder obtained exhibits a heterogeneous morphology, being made up of nonuniform particles and exhibiting a wide particle size distribution.

The invention overcomes this disadvantage of the known process by providing a new process which makes it possible to obtain, economically and easily, mixed metal oxide powders in the form of uniform spherical particles.

SUMMARY OF THE INVENTION

Accordingly, the invention relates to a process for the manufacture of a mixed metal oxide powder, in which at least one metal alcoholate is hydrolysed in the presence of at least one metal oxide or hydroxide; according to the invention, the hydrolyzed is conducted in the presence of an acidic organic compound containing more than 6 carbon atoms in the molecule.

Within the scope of the invention, a mixed metal oxide powder is intended to denote a powder which contains oxides of at least two different metals. According to the invention, the powder may contain more than two different metal oxides. Mixed metal oxides are a solid solution, i.e. a homogeneous mixture at the molecular or ionic level.

In the process according to the invention, the metal alcoholate denotes any compound in which a metal is linked through an oxygen atom to a hydrocarbon group such as an aromatic group or a linear or cyclic, saturated or unsaturated, unsubstituted or partially or completely substituted aliphatic group. Metal alcoholates containing aliphatic groups are especially recommended; those containing saturated or substituted aliphatic groups are preferred, such as, for example, the methyl, ethyl, n-propyl, isopropyl, n-butyl and isobutyl groups. It is immaterial whether an isolated metal alcoholate or a mixture of metal alcoholates is employed.

The purpose of the hydrolysis is to decompose the metal alcoholate. It is conducted in the presence of a metal oxide or hydroxide, to precipitate mixed metal oxides. An isolated metal oxide or hydroxide or a mixture of metal oxides and/or hydroxides may be employed.

DETAILED DESCRIPTION OF THE INVENTION

According to the invention, the cohydrolysis is performed in the presence of an acidic organic compound.

An acidic organic compound is intended to denote an organic acid or an organic acid derivative. The organic acid derivative may be acidic in nature or may be devoid of acidic nature, being, for example, a neutral substance in this case. Saturated or unsaturated carboxylic acids and their derivatives are especially recommended. It is recommended to choose acids or acid derivatives containing more than six carbon atoms in their molecule. Carboxylic acids which have been found to be especially advantageous are those containing at least eight carbon atoms in their molecule, such as octanoic, lauric, palmitic, isopalmitic, oleic and stearic acids. Carboxylic acids containing more than ten carbon atoms in their molecule were preferred. Examples of organic acid derivatives which can be employed in the process according to the invention are the anhydrides, esters and salts of these acids.

It has been noted that the acidic organic compound affects the morphology of the mixed metal oxide powder, by inhibiting the agglomeration of the particles and by imparting a spherical profile to the latter. As a general rule, it should be employed in sufficient quantity for its effect on the powder morphology to be apparent, while avoiding, nevertheless, exceeding a threshold beyond which its effect on the quality of the powder could be negative. In practice, the optimum quantity of acidic organic compound recommended to be used depends on many factors including, in particular, the acidic organic compound chosen (chiefly the length of its carbon chain), the metal alcoholate and oxide or hydroxide which are employed, as well as the operating conditions. It must be determined in each individual case as a function of the quality of the powder morphology which is sought. In general, the use of a mass of acidic organic compound of between 20 and 200 g per mole of all the elementary metal oxides forming the mixed metal oxide to be produced is recommended. Quantities of between 50 and 150 g are preferred in the case where the acidic organic compound is chosen from carboxylic acids. In the case where the mixed metal oxide to be produced is barium titanate, it is recommended to use a carboxylic acid in a quantity of between 70 and 110 g per mole of all the elementary metal oxides.

The hydrolysis may be carried out in the surrounding air. Nevertheless, to avoid carbonation of the basic metal hydroxide, it is recommended to employ a $CO_2$-free atmosphere. According to a particular embodiment of the process according to the invention, the hydrolysis may be performed under a moisture-free gas atmosphere, to avoid the risk of an uncontrolled decomposition of the metal alcoholate. Dry, dehydrated and decarbonated air, nitrogen and argon are examples of atmospheres which can be employed in this embodiment of the invention.

In principle, the temperature and the pressure are not critical. In general, in most cases, it is possible to work at ambient temperature and at normal atmospheric pressure.

In carrying out the process according to the invention, the hydrolysis is regulated to precipitate the mixed metal oxides in the form of a powder, without forming a gel. For this purpose, it is recommended to produce a homogeneous mixture of the metal alcoholate, of the metal oxide or hydroxide, of water and of the acidic organic compound as quickly as possible, before nucleation commences. To this end, in a preferred embodiment of the process according to the invention, the metal alcoholate, the metal oxide or hydroxide, and water are used in the form of organic solutions It is appropriate that the organic solvent for the alcoholate should be free from water. It is recommended, furthermore, to avoid the presence of solid particles in the organic solutions. Identical or different organic solvents may be employed for the metal alcoholate, metal oxide or hydroxide and water In the case of different organic solvents, it is generally recommended that these should be miscible. Alcohols and their derivative are suitable, particularly methanol, ethanol, n-propanol, isopropanol, n-butanol and isobutanol. The optimum degrees of dilution of the metal alcoholate, of the metal oxide or hydroxide and of water in their respective organic solvents depend on various factors, particularly on the alcoholate employed, on the quantity and the nature of the acidic organic compound chosen, on the working temperature and on the quality of the metal oxide powder which is sought. They must be determined by routine laboratory work in each individual case. For example, alcoholic solutions whose respective contents of metal alcoholate and of metal hydroxide or oxide do not exceed 5 moles per liter, and which are preferably between 0.02 and 0.05 mole per liter, may be advantageously employed.

This preferred embodiment adapted to the use of oxides or hydroxides of metals chosen from barium, strontium, boron, selenium and tellurium and those of Group Ia of the Periodic Table of the Elements, such as sodium, potassium, rubidium and caesium. The metal alcoholate may be any metal alcoholate capable of being converted into the corresponding metal oxide or hydroxide by hydrolysis. By way of nonlimiting examples, the process according to the invention applies to the use of alcoholates of metals selected from Li, Na, K, Be, Mg, Ca, Sr, Ba, Ti, Zr, Nb, Ta, Mn, Fe, Co, Cu, Zn, Cd, Al, Ga, In, Si, Ge, Sn, Pb, As, Sb, Bi, Te, Y and La, and rare earths such as Nd, Sm, Eu and Gd (Ferroelectronics, Vol. 49, 1983, pages 285-296: "Ultrafine Electroceramic Powder Preparation from Metal Alkoxides").

There are various possible ways of performing the process according to the invention.

According to a first operating procedure, the acidic organic compound is introduced into a reaction chamber separately but simultaneously with solutions of the metal alcoholate, the metal oxide or hydroxide and water, in an organic solvent.

According to a second operating procedure, which is preferred, a homogeneous premix of the metal hydroxide or oxide with water is first produced in a common organic solvent, for example an alcohol. The acidic organic compound is added to the metal alcoholate; and all the reactants are then combined.

In each of these operating procedures, it is possible to operate as set out in British Patent Application No. 2,168,334.

In an advantageous alternative form of each of the operating procedures just described, a metal hydroxide hydrate, in solution in an organic solvent, is employed, the water of hydration of the metal hydroxide forming at least a part of the water necessary for the hydrolysis reaction. It is preferred to choose a metal hydroxide hydrate whose degree of hydration is sufficient to contribute all the water necessary for the hydrolysis of the metal alcoholate.

When the hydrolysis reaction is complete, a powder is collected, in the form of fine particles consisting of a complex mixture of metal oxides in an amorphous state, which are hydrated to a greater or lesser degree, and of organic residues. Essentially, the powder consists of generally spherical particles of a diameter not exceeding 5 microns and usually of between 0.05 and 2 microns.

The powder may optionally be subjected to a drying and to a heat treatment at an appropriate temperature, to remove the acidic organic compound, the water and the organic solvents which it contains. The heat treatment may be adjusted to control the porosity or to get rid of it completely. It may be adjusted, furthermore, to produce a crystallization of the metal oxides.

The process according to the invention is well adapted to the production of mixed metal oxide powders intended for fabricating ceramic materials which, by definition, are nonmetallic inorganic materials whose fabrication from a powder requires high-temperature treatments such as melting or sintering treatments (P. William Lee —"Ceramics"—1961—Reinhold Publishing Corp. — page 1; Kirk Othmer Encyclopedia of Chemical Technology — Third edition —Volume 5—1979, John Wiley & Sons, USA — pages 234 to 236: "Ceramics, scope"). In particular, the process according to the invention finds an advantageous application for the production of mixed metal oxide powders of general formula:

$$ABO_3$$

in which A denotes barium and/or strontium and B denotes at least one metal of valency 4 of Group 4 of the Periodic Table of the Elements. Examples of such mixed metal oxides are barium titanate, strontium titanate, barium zirconate, strontium zirconate, barium metasilicate, mixed barium zirconium silicate and mixtures of these compounds, some of which find an advantageous application in the manufacture of semiconductors.

The process according to the invention also applies to the production of mixed metal oxide powders combining more than two different metal oxides such as, for example, La-Ba-Cu-O powders, La-Sr-Cu-O powders or Y-Ba-Cu-O powders which exhibit remarkable superconductor characteristics (La Recherche, No. 187, April 1987, pages 512 to 515: "Des supraconducteurs sur le chemin des 100 kelvins" [Superconductors on the way to 100 Kelvin]).

The mixed metal oxide powders obtained using the process according to the invention consist of spherical particles. They are outstanding in their remarkable chemical homogeneity, a relatively narrow particle size distribution and a virtual absence of agglomerates.

Accordingly, the invention also relates to mixed metal oxide powders, for example of barium titanate, which are obtained by the process according to the invention and which consist of spherical particles whose diameter does not exceed 5 microns and is preferably between 0.05 and 2 microns.

BRIEF DESCRIPTION OF THE DRAWINGS

The few examples whose description is to follow are used to illustrate the invention. These examples are given with reference to attached FIGS. 1 to 5, which are five photographic reproductions of mixed metal oxide powders according to the invention, observed using an electron transmission microscope, at a magnification of 20,000x.

EXAMPLES

Examples 1 to 3, described below, concern attempts to manufacture barium titanate powders according to the following operating procedure, in accordance with the invention.

A solution of titanium alcoholate in alcohol, on the one hand, and a solution of barium hydroxide monohydrate in alcohol, on the other hand, were prepared separately under a dry nitrogen atmosphere. The two solutions obtained were filtered through a filter with a pore opening of 0.2 micron, available commercially under the trademark Millipore (Millipore Corporation).

After adding a controlled quantity of carboxylic acid to the titanium alcoholate solution, the two solutions were introduced into a reaction chamber maintained under a dry nitrogen atmosphere and were subjected to intense stirring to obtain a homogeneous reaction mixture quickly before any nucleation commences. The reaction mixture then underwent a maturation of 2 hours with moderate stirring, at 60° C. At the end of the maturation, the reaction mixture was subjected to a centrifuging operation and a barium titanate powder was recovered, which was washed with alcohol and was then dried in a stream of nitrogen at ambient temperature.

In the examples, the mean diameter of the barium titanate powders was calculated from measurements on the photographic reproductions, the mean diameter being defined by the following relationship (G. Herdan —"Small particle statistics"—2nd edition —1960 —Butterworths pages 10 and 11):

$$d = \frac{\Sigma n_i d_i}{\Sigma n_i}$$

where $n_i$ denotes the number of particles of diameter $d_i$.

Example 1

This example is characterized by the following operating conditions:
titanium alcoholate solution: 65 ml of a 0.2 molar solution of titanium n-propoxide in n-propanol, at 25° C.;
barium hydroxide solution: 200 ml of a 0.065 molar solution of barium hydroxide monohydrate in a mixture of methanol and n-propanol (in the ratio of 1 volume of methanol to 2 volumes of propanol), at 25° C.;
carboxylic acid: 2.85 ml of oleic acid.

To carry out the test, the oleic acid and 57.15 ml of n-propanol were first added to the titanium n-propoxide solution. The resultant premix was introduced into the reaction chamber, where it was heated to 60° C. The solution of barium hydroxide hydrate was then added to it in one lot, at 25° C. The temperature of the reaction mixture in the reaction chamber became steady at about 45° C.

Figure 1:
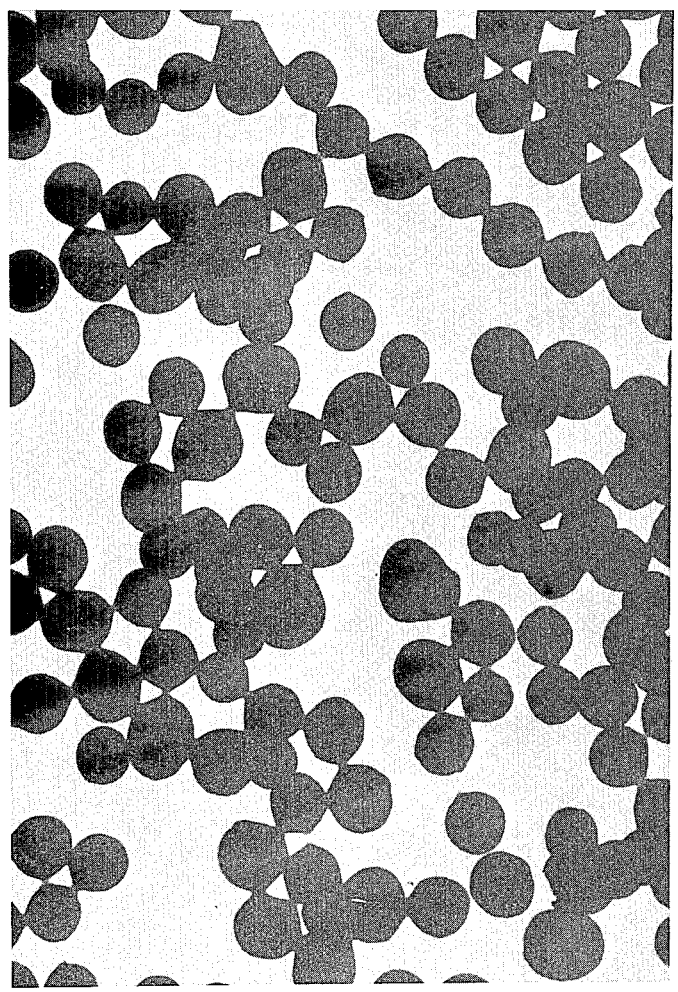

The amorphous powder obtained at the end of the drying is shown in FIG. 1. It has a mean particle diameter of 0.59 micron.

EXAMPLE 2

The following reactants were employed:
titanium alcoholate solution: 200 ml of a 0.05 molar solution of titanium isopropoxide in a mixture of methanol and isopropanol (50:50% by volume);
barium hydroxide hydrate solution: 200 ml of a 0.05 molar solution of barium hydroxide monohydrate in a mixture of methanol and isopropanol (50:50% by volume);
carboxylic acid: 2 ml of oleic acid.

The titanium isopropoxide solution and the oleic acid were first introduced into the reaction chamber, this premix was heated therein to 60° C. and then, while it was kept vigorously stirred, the barium hydroxide solution was added to it at 25° C. The temperature of the reaction mixture became steady at about 45° C. The test was then continued as described above.

Figure 2:
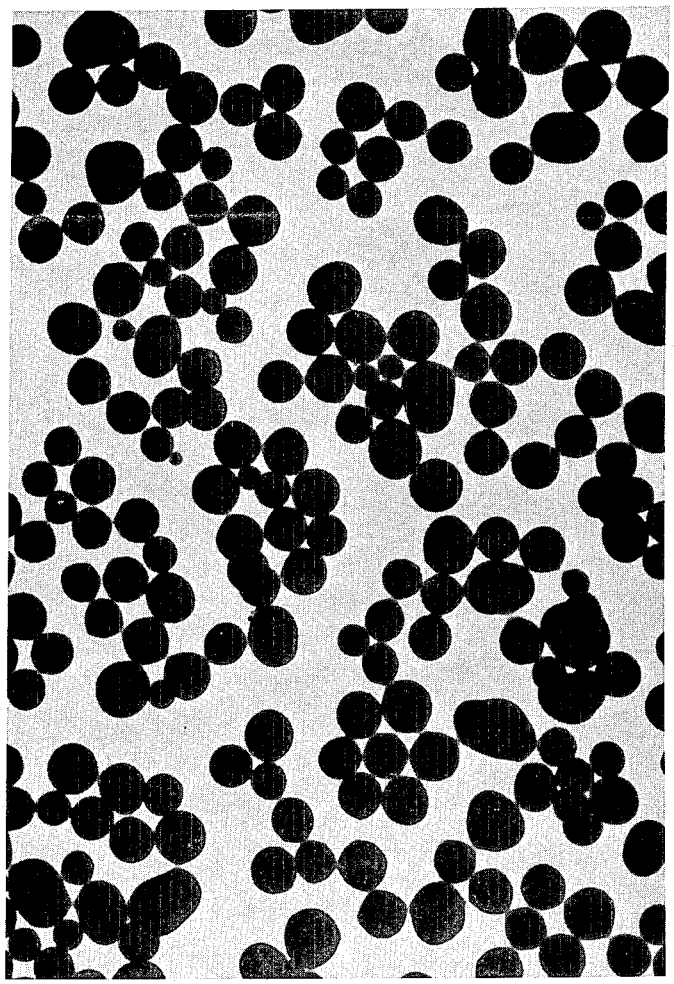

The powder obtained at the end of the test is shown in FIG. 2. It has a mean particle diameter of 0.35 micron.

EXAMPLE 3

The conditions of Example 1 were reproduced, changing the order of introduction of the reactants into the reaction chamber. For this purpose, the barium hydroxide solution, kept at 25° C., was introduced into the reaction chamber first. The premix made up of the oleic acid, the titanium n-propoxide and n-propanol, at 25° C. was then added to it in one lot.

Figure 3:
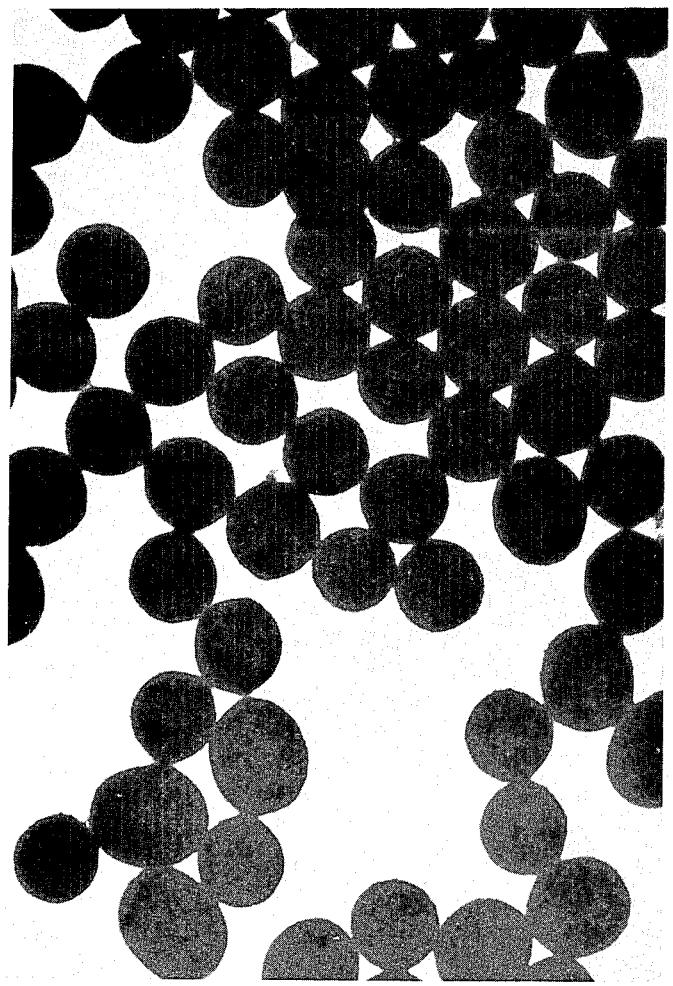

The powder obtained at the end of drying is shown in FIG. 3. It has a mean particle diameter of 0.75 μm.

Figure 4:
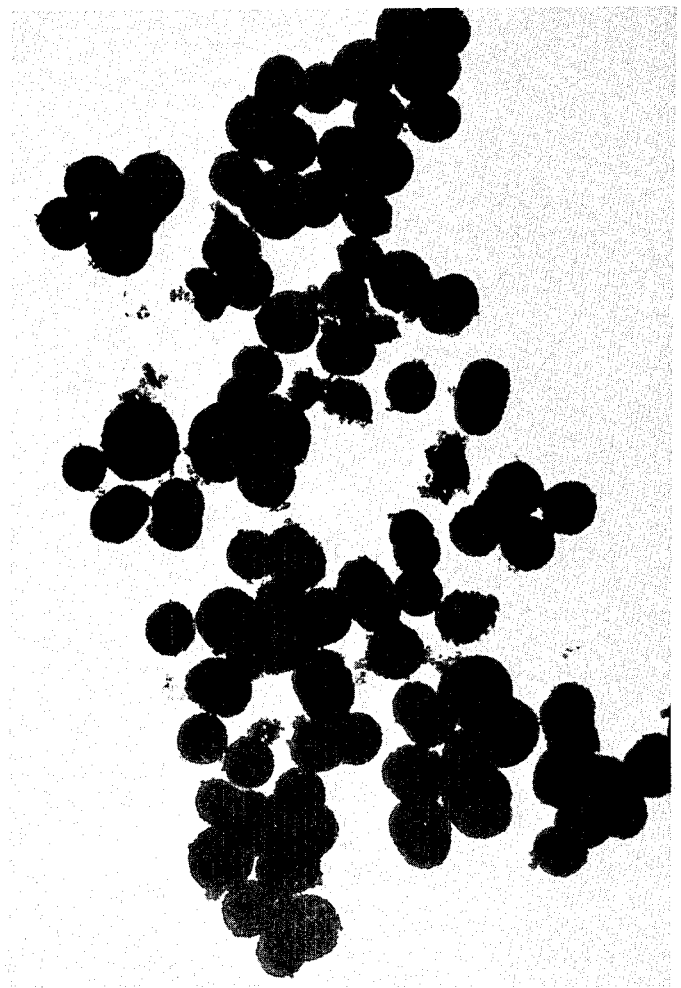

The test was continued by subjecting the powder recovered from drying to a heat treatment at 650° C., in air. At the end of this heat treatment, a crystallized powder, which can be seen in FIG. 4, was recovered.

EXAMPLE 4

This example concerns the preparation, in accordance with the invention, of a powder of mixed titanium, zirconium, barium and strontium oxides.

The following were introduced first into a reaction chamber maintained under a dry nitrogen atmosphere:
32 ml of a 0.2 molar solution of titanium n-propoxide in n-propanol,
8 ml of a 0.2 molar solution of zirconium n-propoxide in n-propanol,
1.75 ml of oleic acid, and
58.25 ml of propanol.

The mixture was heated to 60° C. and then, while it was kept vigorously stirred, the mixture of the following solutions, at 25° C., was added to it in a single lot:
80 ml of a 0.08 molar solution of barium hydroxide monohydrate in a mixture of methanol and propanol (30:70% by volume), and
20 ml of a 0.08 molar solution of strontium hydroxide monohydrate in methanol.

The temperature of the reaction mixture in the reaction chamber became steady at about 45° C.

The reaction mixture then underwent a maturation of 2 hours at 60° C., with moderate stirring. At the end of the maturation, the reaction mixture was subjected to a centrifuging operation and a powder of mixed titanium, zirconium, barium and strontium oxides was collected.

The powder was washed with alcohol and was then dried in a stream of nitrogen at ambient temperature.

Figure 5:
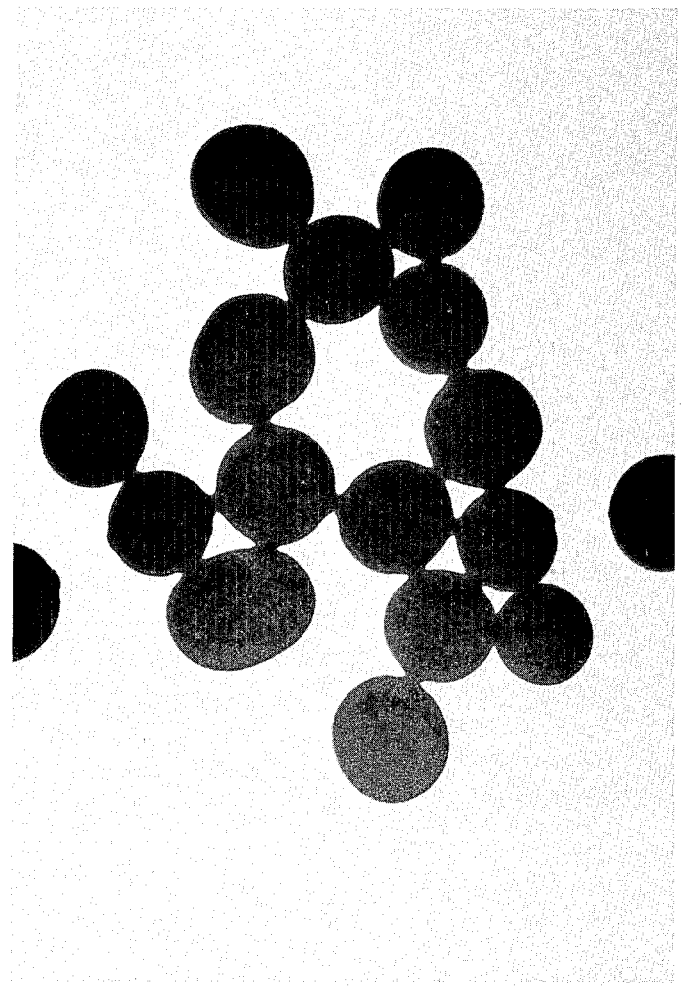

The powder obtained can be seen in FIG. 5. It has a mean particle diameter of 0.98 μm.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. Process for the manufacture of a powder of mixed metal oxides, comprising dissolving at least one metal alcoholate in an organic solvent to have an organic solution of said at least one metal alcoholate;

dissolving at least one metal hydroxide in an organic solvent to have an organic solution of said at least one metal hydroxide;

mixing said organic solution of said at least one metal alcoholate, said organic solution of said at least one metal hydroxide, water and an organic compound selected from carboxylic acids containing more than six carbon atoms in the molecule, anhydrides of said carboxylic acids, esters of said carboxylic acids and salts of said carboxylic acids, said mixing being in conditions to hydrolyze said at least one metal alcoholate and precipitate mixed metal oxides as a powder without forming a gel; and collecting said powder.

2. Process according to claim 1, further comprising chosing the organic compound from carboxylic acids containing at least 8 carbon atoms in the molecule and derivatives of these compounds.

3. Process according to claim 1, further comprising using the organic compound in a quantity of between 20 and 200 g per mole of all the elementary metal oxides forming the mixed metal oxide to be produced.

4. Process according to claim 1, further comprising to carry out the hydrolysis, mixing the metal alcoholate, the metal oxide or hydroxide, water and the organic compound so as to produce a homogeneous mixture before nucleation commences.

5. Process according to claim 1, further comprising using the metal alcoholate, the metal oxide or hydroxide and water in the form of organic solutions.

6. Process according to claim 1, further comprising using a metal hydroxide hydrate.

7. Process according to claim 5, further comprising chosing the metal oxide or hydroxide from the oxides and hydroxides of barium, strontium, boron, selenium, tellurium and metals of Group Ia of the Periodic Table of the Elements.

8. Process according to claim 1, further comprising subjecting the powder recovered from hydrolysis to a heat treatment.

9. Mixed metal oxide powders obtained by means of a process in accordance with claim 1, consisting of spherical particles whose diameter is between 0.05 and 2 microns.

10. Mixed metal oxide powders obtained by means of a process in accordance with claim 8, of general formula:

$$ABO_3$$

in which A denotes barium and/or strontium and B denotes at least one metal of valency 4 of Group 4 of the Periodic Table of the Elements.

11. Powders according to claim 10, in which the compound $ABO_3$ is barium titanate.

12. Process according to claim 1, wherein said carboxylic acids containing more than 6 carbon atoms in the molecule are carboxylic acids containing up to 18 carbon atoms in the molecule.

13. Process according to claim 1, wherein said mixing being in conditions to precipitate the mixed metal oxides as a powder having particle size between 0.05 and 5 microns.

14. Process according to claim 1, wherein said mixing being in conditions to precipitate the mixed metal oxides as a powder of generally spherical particles having particle size between 0.05 and 5 microns.

* * * * *